(12) United States Patent
Tsai et al.

(10) Patent No.: US 8,461,908 B1
(45) Date of Patent: Jun. 11, 2013

(54) CURRENT COMPENSATING DEVICE

(75) Inventors: Chao-Wei Tsai, New Taipei (TW);
Chia-Chieh Lin, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 13/337,090

(22) Filed: Dec. 24, 2011

(51) Int. Cl.
*G05F 1/10* (2006.01)

(52) U.S. Cl.
USPC ............................................ 327/530

(58) Field of Classification Search
USPC ............................................ 327/530
See application file for complete search history.

(56) References Cited

U.S. PATENT DOCUMENTS

| | | | | |
|---|---|---|---|---|
| 3,603,843 A | * | 9/1971 | Clements | 361/91.8 |
| 3,746,887 A | * | 7/1973 | Lorenz | 327/455 |
| 3,821,634 A | * | 6/1974 | Sabolic | 323/321 |
| 4,336,563 A | * | 6/1982 | Suzuki | 361/100 |
| 4,713,719 A | * | 12/1987 | Kugelman | 361/54 |
| 5,088,018 A | * | 2/1992 | Lee | 363/56.01 |
| 5,680,035 A | * | 10/1997 | Haim et al. | 323/277 |
| 2010/0321000 A1 | * | 12/2010 | Lee et al. | 324/76.11 |
| 2012/0161522 A1 | * | 6/2012 | Nam | 307/64 |
| 2012/0275199 A1 | * | 11/2012 | Li et al. | 363/21.15 |

* cited by examiner

*Primary Examiner* — Thomas J Hiltunen
(74) *Attorney, Agent, or Firm* — Chun-Ming Shih; HDLS IPR Services

(57) ABSTRACT

A compensating device is used for providing current compensation of an IC when operating in the high-voltage. The current compensating device includes a detecting unit, a rectifier, a filtering unit and a switching unit. The detecting unit electrically connected to an AC voltage. The rectifier is electrically connected to the detecting unit. The filtering unit is electrically connected to the rectifier. The switching unit is electrically connected to the filtering unit. The switching unit is conducted and provides a current to the IC when the AC voltage is above a predetermined voltage.

6 Claims, 3 Drawing Sheets

CURRENT COMPENSATING DEVICE

BACKGROUND OF THE INVENTION

1. Field of the Invention

The present invention relates to a current compensating device, especially to a current compensating device for an IC operating in high-voltage, the current compensating device provides a compensating current to the IC when the IC is operated in high-voltage and modulates PWM frequency at the same time.

2. Description of Prior Art

Power supply is an essential unit of electrical device and usually has a power converter. Among them, switch power supply uses pulse width modulation technology to modulate input power fed to load. PWM controller (or called pulse width modulator) turns on/off switches between power supply and load and changes a DC input voltage into a series of pulse voltage, then the pulse voltage is converted by transformer and diode to form smoothly DC voltage. The output voltage is compared with a reference voltage and voltage difference feedback to the PWM controller. If the output voltage is above desired voltage, the PWM controller reduces pulse width of input voltage so as to decrease supplying power and then the output voltage reply to desire voltage. Such that the power factor of the power supply is reduced when operating in high-voltage and then increase power loss.

SUMMARY OF THE INVENTION

It is an object of the present invention to provide a current compensating device, the current compensating device can effectively enhance power factor of a power supply.

Accordingly, the current compensating device according to one aspect of the present invention is used for providing current compensation of an integrated circuit (IC) when operating in the high-voltage. The current compensating device comprises a detecting unit, a rectifier, a filtering unit, a switching unit and a resistor. The detecting unit is electrically connected to an alternating current (AC) voltage, the rectifier is electrically connected to the detecting unit, the filtering unit is electrically connected to the rectifier and the switching unit is connected to the filtering unit and the IC through the resistor. Wherein the switching unit is conducted and provided a current to the IC when the AC voltage is above a predetermined voltage.

In the present invention, current compensating device gains an AC voltage through the detecting unit, and then delivers to the switching unit through the rectifier and the filtering unit. The switching unit is conducted when the AC voltage is above a predetermined voltage and provides a current to the IC and modulating PWM frequency at the same time to enhance power factor.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
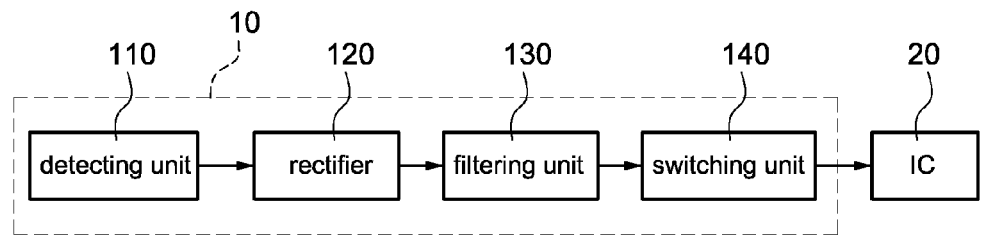
FIG. 1 is circuit block diagram of a current compensating device according to the present invention.
Figure 2:
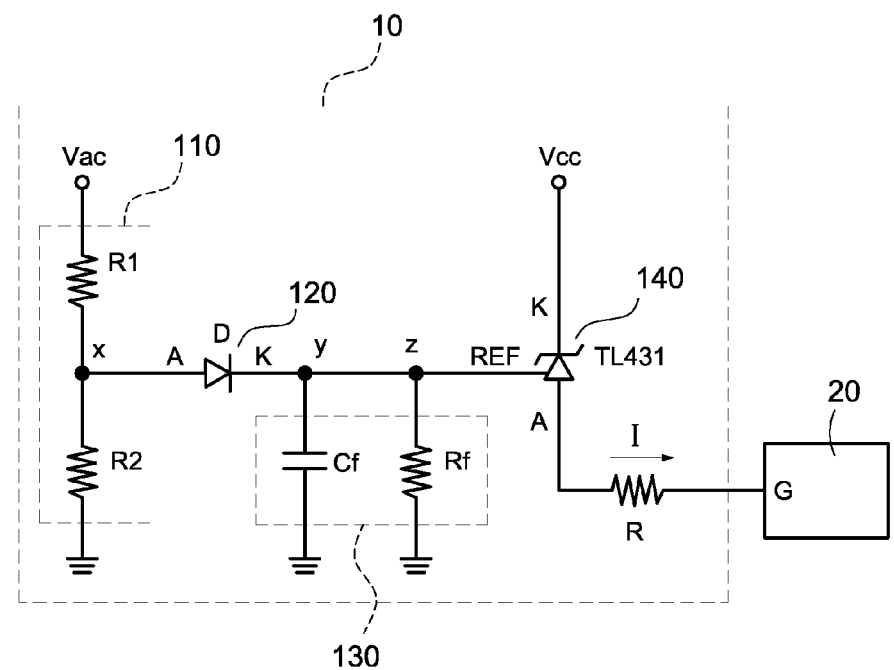
FIG. 2 is a circuit diagram of the current compensating device according to the present invention.
Figure 3:
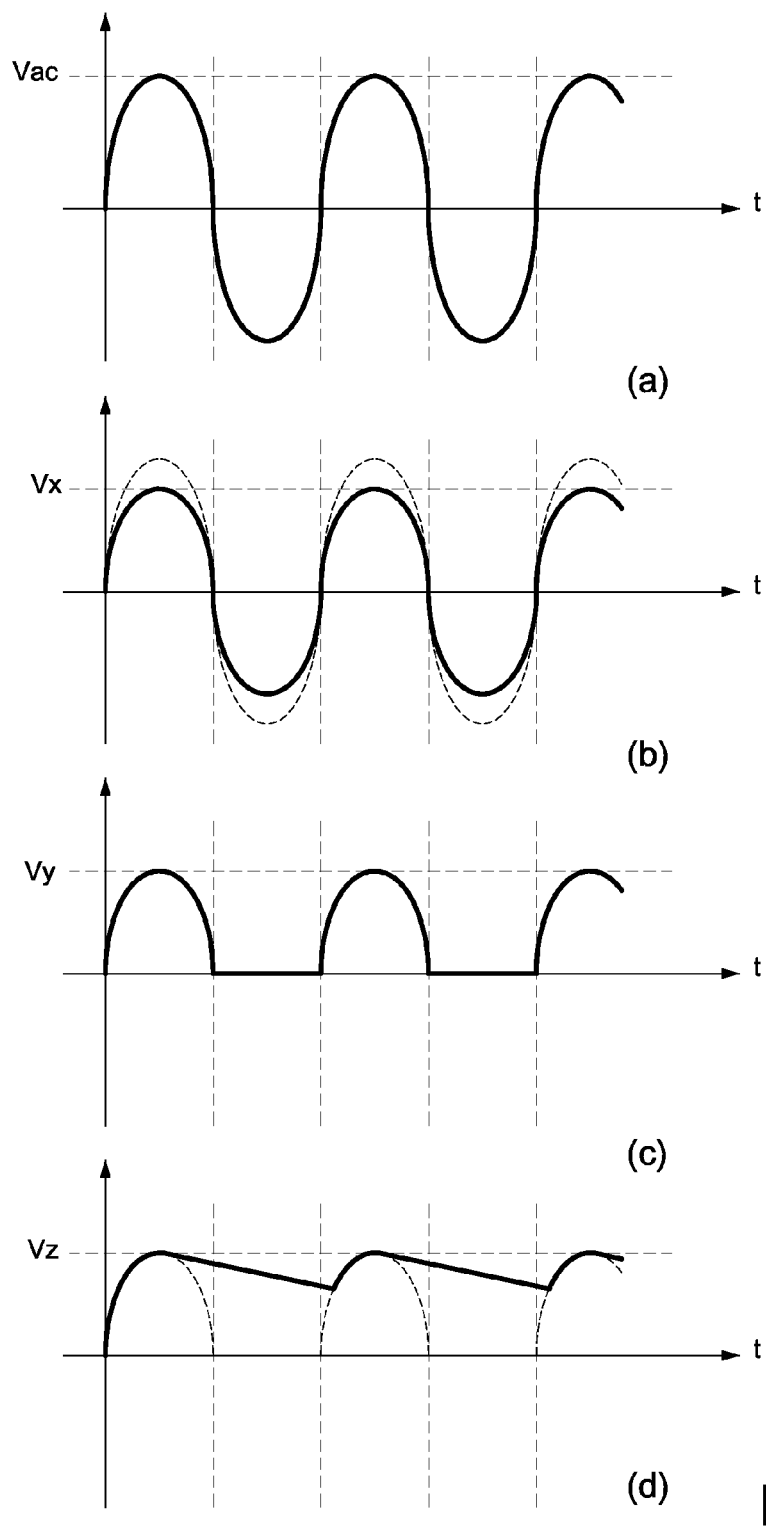
FIG. 3 shows a timing diagram of waveforms according to the present invention.

Reference is made to FIG. 1, which is a circuit block diagram of a current compensating device of the present invention. The current compensating device 10 is disposed within a power supply (not shown) and electrically connected to an integrated circuit (IC) 20. The power supply provides a power for driving the IC 20, the current compensating device 10 provides a compensating current to the IC 20 when the IC 20 is operated in high-voltage and simultaneously modulating PWM frequency of the power supply so as to enhance power factor. The current compensating device 10 includes a detecting unit 110, a rectifier 120, a filtering unit 130 and a switching unit 140. With reference also to FIG. 2, the detecting unit 110 is electrically connected to an alternating current (AC) voltage Vac. In this embodiment, the AC voltage Vac follows the characteristic sinusoidal shape, the waveform of the AC voltage Vac is shown in FIG. 3(*a*). The rectifier 120 is electrically connected to the detecting unit 110, the filtering unit 130 is electrically connected to the rectifier 120 and the switching unit 140 is electrically connected to the filtering unit 130 and the IC 20.

The detecting unit 110 includes a first resistor R1 and a second resistor R2. The first resistor R1 and the second resistor R2 are electrically connected in series between the AC voltage Vac and ground. A first voltage Vx is generated at node x by voltage division of the first resistor R1 and the second resistor R2. The waveform of the first voltage Vx is shown in FIG. 3(*b*), the dotted line in FIG. 3(*b*) corresponding to AC voltage Vac. In the practical application, the first voltage Vx may be adjusted according to the resistances of the first resistor R1 and the second resistor R2.

The rectifier 120 is used to convert a signal with periodically reverse direction (as the AC voltage Vac mentioned above) into a flow in only one direction. In this embodiment, the rectifier 120 provides half-wave rectification and convers the AC voltage Vac to a unipolar output. The rectifier 120 includes a diode D electrically connected to the first resistor R1 and the second resistor R2, and an anode A of the diode D is electrically connected to the point x. Thereby a second voltage Vy is dropped on node y, which can have pulsating waveform indicated in FIG. 3(*c*). The waveform of the second voltage Vy is equal to the positive half period of the AC voltage Vac indicated in FIG. 3(*b*). In the practical application, the rectifier 120 may provide full-wave rectification.

The second voltage Vy rectified by the rectifier 120 still contains a time-dependent component, known as ripple. The filtering unit 130 is used for reducing the ripple and stabilizing the magnitude of direct current (DC) output voltage. The filtering unit 130 is electrically connected to a cathode K of the diode D and includes a filtering capacitor Cf and filtering resistor Rf electrically connected across the filtering capacitor Cf. When the second voltage Vy input, the filtering capacitor Cf charges to the pick of the second voltage Vy. Then the diode D cut off, and the filtering capacitor Cf discharges through the filtering resistor Rf. Thereby a third voltage Vz tending to stabilization is dropped on node z, and FIG. 3(*d*) shows waveform of the third voltage Vz.

In this embodiment, the switching unit 140 is, but not limited to, a TL431 voltage stabilizer. The TL431 voltage stabilizer has an anode A, a cathode K and a reference terminal REF electrically connected to the filtering unit 130 to gain the third voltage Vz which is decided to conduct the TL431 voltage stabilizer or not. The cathode K of the TL431 voltage stabilizer is electrically connected to a direct current voltage Vcc and the anode A electrically connected to the IC 20 through a resistor R.

If the third voltage Vz is significantly below a reference voltage (approximately 2.5 Volts) of the TL431 voltage stabilizer, then the TL431 voltage stabilizer cuts off and there is no current flowing through the resistor R. However, if the third voltage Vz is significantly above the reference voltage, the TL431 turns on and a current I flows through the resistor R. As a result, the current compensating device 10 effectively provides a compensating current to IC 20 and then changes the conductive time of the IC 20, namely, changes the conductive frequency of the IC 20 so as to enhance power factor of the power supply operating in high-voltage and reduce electromagnetic interference (EMI).

Figure 4:
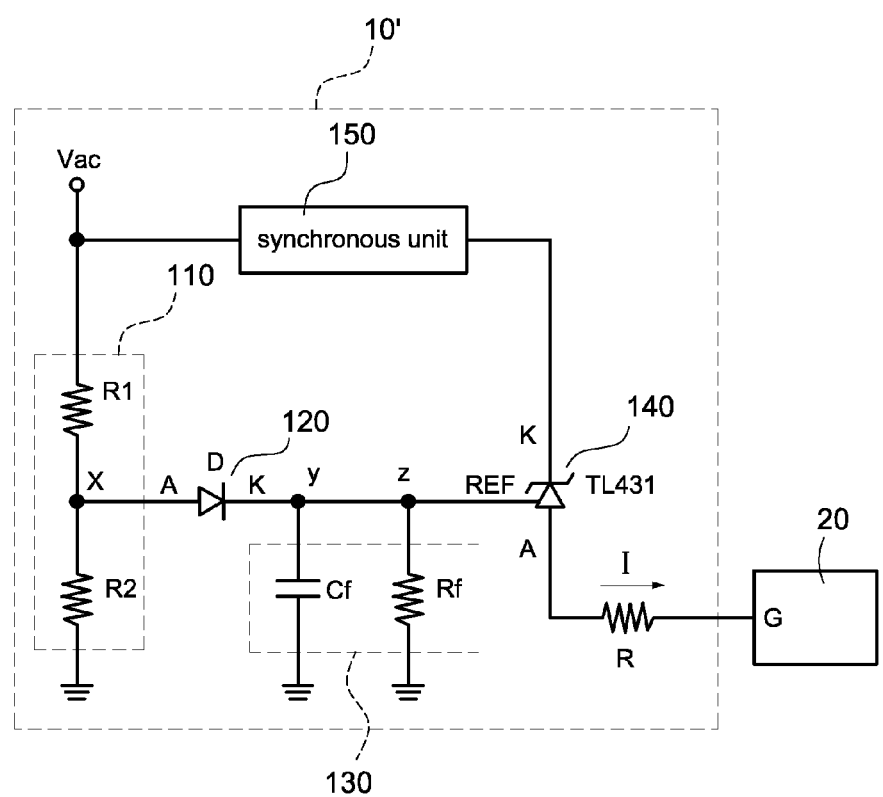
FIG. 4 is another circuit diagram of the current compensating device according to the present invention.

In addition, the cathode K of the TL431 voltage stabilizer may be electrically connected to the AC voltage Vac and the switching unit 140 through a synchronous unit 150, as shown in FIG. 4. Thereby the current I can modulate in time with the AC voltage Vac. Preferably, the current I is direct proportional to the AC voltage Vac, to produce an optimally compensating current and enhance power factor of the power supply operating in high-voltage.

To sum up, the current compensating device 10 of the present invention detects the AC voltage Vac through the detecting unit 110 and then voltage division by the first resistor R1 and the second resistor R2 to generate a first voltage Vx. The first voltage Vx goes through the rectifier 120 and the filtering unit 130, then generates the third voltage Vz. The switching unit 140 is conducted and provides the current I to the IC 20 when the third voltage Vz is above a predetermined voltage to change the conductive frequency of the IC 20 so as to enhance power factor of the power supply.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A current compensating device is used for providing current compensation of an integrated circuit (IC) when operating in the high-voltage, the current compensating device comprising:
    a detecting unit electrically connected to an alternating current (AC) voltage;
    a rectifier electrically connected to the detecting unit;
    a filtering unit electrically connected to the rectifier;
    a switching unit electrically connected to the filtering unit;
    a synchronous unit electrically connected to the AC voltage and the switching unit; and
    a resistor electrically connected to the switching unit and the IC;
    wherein the switching unit is conducted and provides a current to the IC when the AC voltage is above a predetermined voltage.

2. The current compensating device in claim 1, wherein the detecting unit comprises a first resistor and a second resistor electrically connected in series.

3. The current compensating device in claim 2, wherein the rectifier is a half-wave rectifier and comprises a diode electrically connected to the first resistor and the second resistor.

4. The current compensating device in claim 1, wherein the filtering unit comprises a filtering capacitor and a filtering resistor electrically connected in parallel.

5. The current compensating device in claim 1, wherein the switching unit is TL431 voltage stabilizer.

6. The current compensating device in claim 5, wherein the TL431 voltage stabilizer includes an anode, a cathode and a reference terminal, the anode is electrically connected to the resistor, the cathode is electrically connected to a direct current voltage and the reference terminal is electrically connected to the filtering unit.

* * * * *